March 26, 1963 J. D. TURLAY Re. 25,361

INLET MANIFOLD SYSTEM

Original Filed Nov. 14, 1952 3 Sheets-Sheet 1

INVENTOR.
Joseph D. Turlay
BY
L. D. Busch
ATTORNEY

INLET MANIFOLD SYSTEM

Original Filed Nov. 14, 1952 3 Sheets-Sheet 2

INVENTOR.
Joseph D. Turlay
BY
L. D. Burch
ATTORNEY

INLET MANIFOLD SYSTEM

Original Filed Nov. 14, 1952 3 Sheets-Sheet 3

INVENTOR.
Joseph D. Turlay
BY
L. D. Busch
ATTORNEY

United States Patent Office

Re. 25,361
Reissued Mar. 26, 1963

25,361
INLET MANIFOLD SYSTEM

Joseph D. Turlay, Flint, Mich., assignor to General Motors Corporation, Detroit, Mich., a corporation of Delaware Original No. 2,725,047, dated Nov. 29, 1955, Ser. No. 320,519, Nov. 14, 1952. Application for reissue Aug. 5, 1957, Ser. No. 677,811
11 Claims. (Cl. 123—122)

Matter enclosed in heavy brackets [ ] appears in the original patent but forms no part of this reissue specification; matter printed in italics indicates the additions made by reissue.

This invention relates to inlet manifolding systems for engines and has particular relation to a system especially applicable for use on V-type 8-cylinder and other internal combustion engines for automotive and other uses.

It has been the practice heretofore to construct inlet manifolds for engines by forming in a cast or other suitable manifold body, main distribution and branch passages that extend horizontally within the body and the outlets from which extend in parallel planes that are either normally or obliquely disposed with respect to the horizontal plane of the passages. Also it has been customary to so position the manifold outlets on opposite sides of the manifold body that a heating passage can be formed in the body to extend substantially across the middle of the main distribution passages so that the heating fluid can be supplied for heating the main distribution passages just beneath and around the junctions between the main distribution passages and the mixture supply passages leading to the manifold.

Not only have these manifolds been difficult to construct but it has been extremely difficult to bolt such manifolds to an engine. The expansion and contraction due to variations in temperature tend to loosen the manifold and cause leakage of gas to the surrounding atmosphere. Manifolds of this type also do not efficiently and effectively heat the charge being supplied to the engine.

It is proposed to construct an inlet manifold with all of the outlet and inlet passages leading to and from the engine in a single plane. This not only makes the manufacture of the manifold much simpler as far as machining operations are concerned but it makes possible the bolting of the manifold to the engine in such manner that expansion and contraction of the manifold will merely cause a slight transverse bending of the bolts by which the manifold is secured to the engine and will not loosen the bolts or release the gaskets which are employed between the manifold inlets and outlets and the various passages leading to and from the engine.

It is also proposed to construct a manifold so that the manifold outlets at each end of the manifold are spaced from adjacent pairs of manifold outlets intermediate the ends of the manifolds. This makes possible provision of heating passage inlets and outlets on each side of and adjacent each end of the manifold. These passages may extend across the manifold in such manner as to heat the branch passages and the ends of the main distribution passages at the junctions of the main distribution passages and the branch passages. This permits the combustible mixture to travel a greater distance from the carburetor before being heated and causes the mixture to vaporize and atomize to a greater extent without heating. The mixture therefore requires less heating which results in a corresponding increase in volumetric efficiency of the engine.

Figure 1:
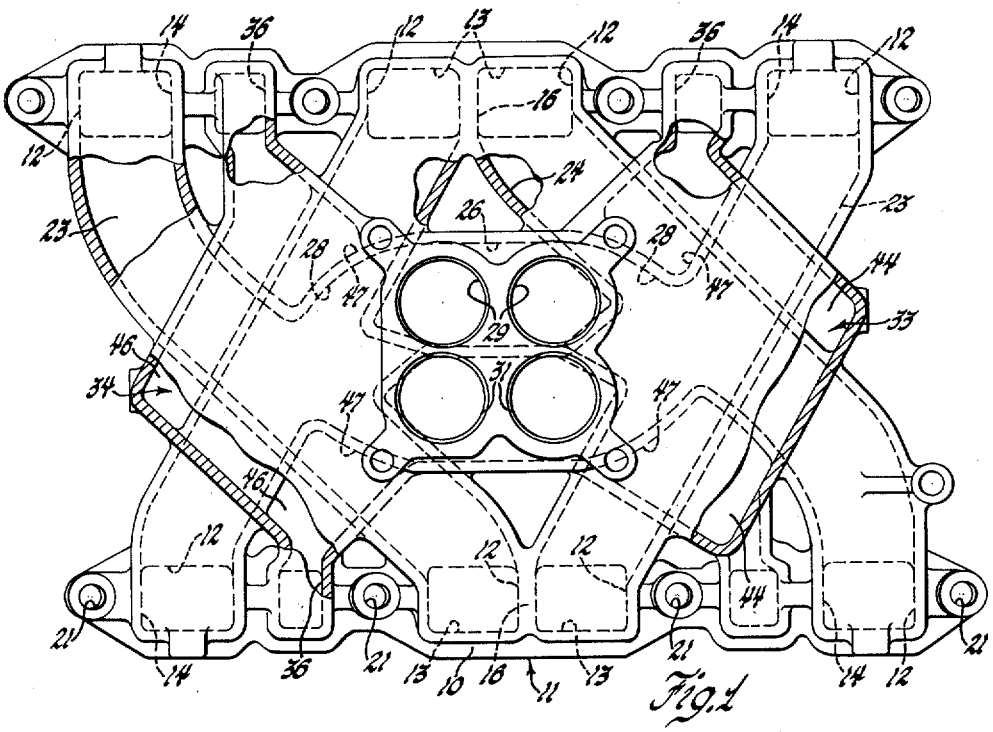
FIGURE 1 is a plan view of an inlet manifold embracing the principles of the invention.
Figure 2:
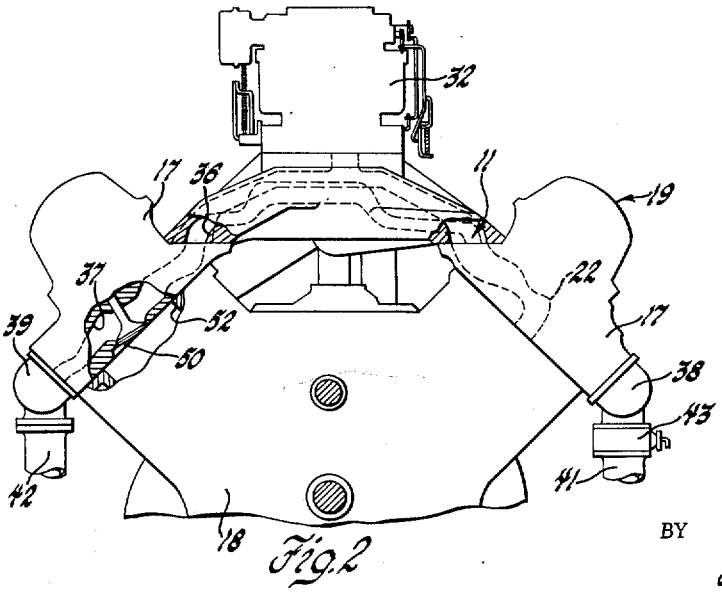
FIGURE 2 is an end view of a V-type engine in which the manifold illustrated by FIGURE 1 is employed.
Figure 3:
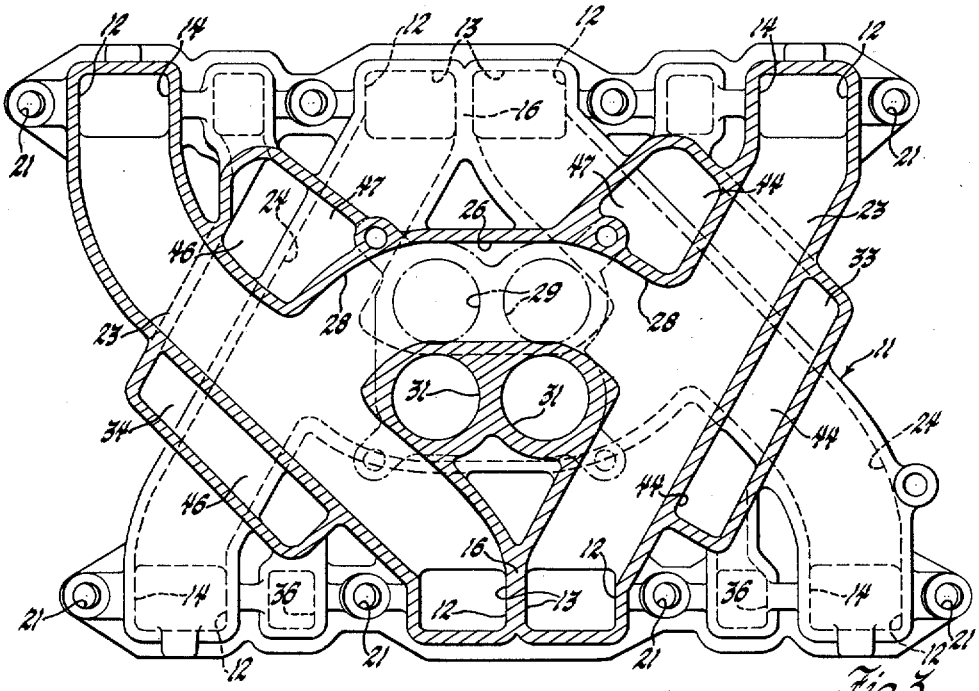
FIGURE 3 is a horizontal sectional view through the upper distribution and branch passages embraced in the manifold illustrated by FIGURES 1 and 2.
Figure 4:
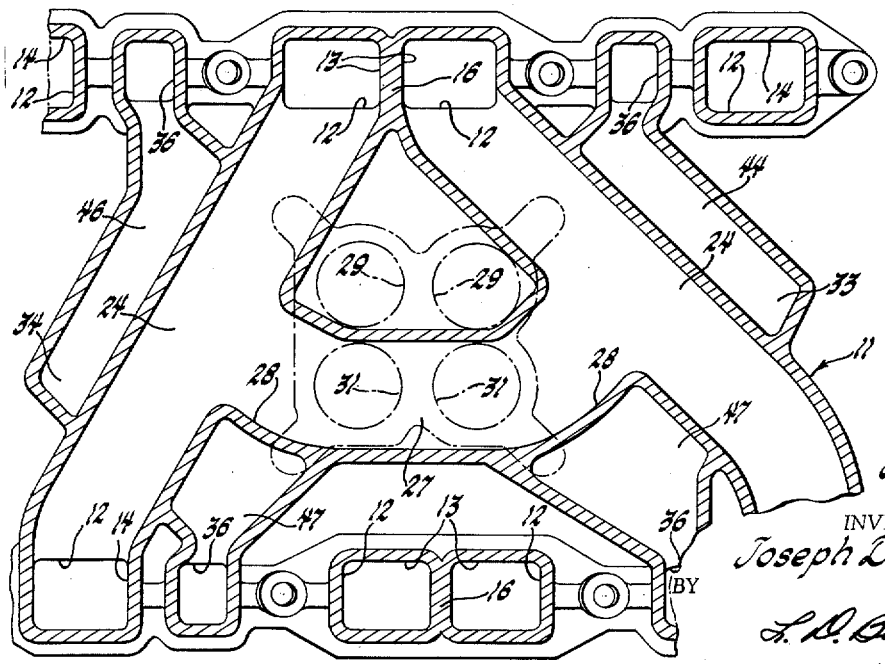
FIGURE 4 is a horizontal sectional view through the lower distribution and branch passages embraced in the manifold illustrated by FIGURES 1 and 2.
Figure 5:
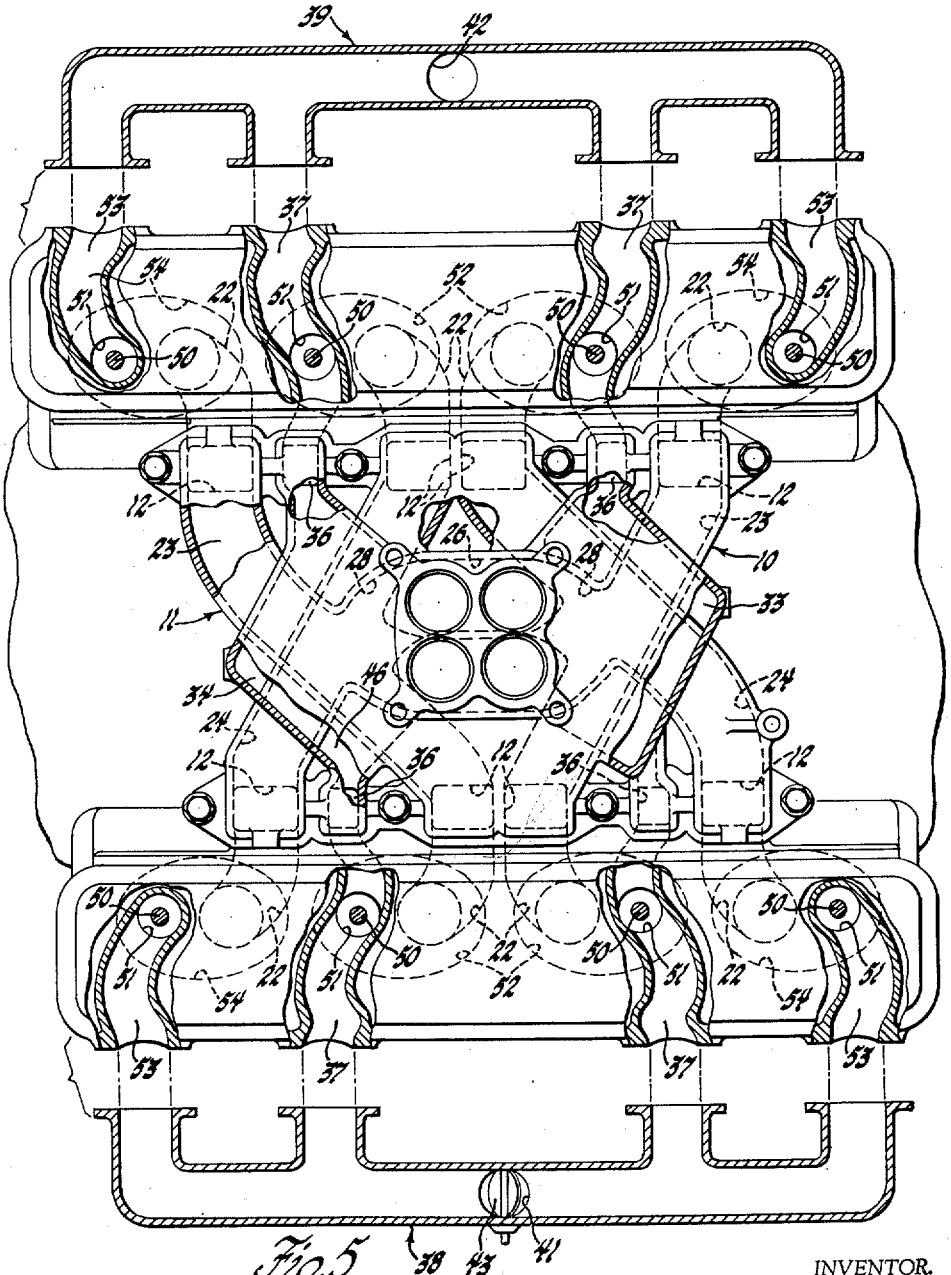
*FIGURE 5 is a plan view, with portions thereof being broken away, of an internal combustion engine embodying the present invention.*

The manifold 10 embracing the invention comprises a cast or other suitably formed manifold body 11 having manifold outlets 12 formed in parallel rows and in the same plane on opposite sides of the manifold body. The manifold outlets 12 on each side of the body 11 are formed in such a way as to provide adjacent pairs of manifold outlets indicated at 13 and remote pairs of manifold outlets indicated at 14. The adjacent pairs 13 of manifold outlets are disposed intermediate the opposite ends of the manifold and are separated from one another by common walls indicated at 16. The remote pairs 14 of manifold outlets are located adjacent the opposite ends of the manifold body 11 and are spaced from the adjacent pairs 13 of manifold outlets. As will be apparent from examining FIGURE 2 the manifold outlets 12 are all adapted to be secured on surfaces formed in the same plane and on the inside of a pair of engine heads 17 which may be secured to a block 18 of a V-type engine indicated at 19. The manifold 10 may be secured to the head 17 in any suitable manner as for example by bolts projecting through openings 21 which may be formed in spaced relation to one another along each side of the manifold body 11. The manifold outlets 12 each are adapted to communicate with one cylinder of the engine 19 through inlet passages 22 which in turn communicate with the combustion chambers of the engine.

Horizontally disposed branch passages 23 and 24 are formed in the body 11 transversely across the manifold 10 between one of the manifold outlets 12 of the remotely disposed pairs 14 and one of the manifold outlets 12 of the adjacent pairs 13. The branch passages 23 are disposed above the branch passages 24 and in such manner that the passages do not intersect in crossing one another between the manifold outlets to which they are connected. The body 11 also is formed in such manner as to provide parallel main distribution passages 26 and 27 which extend lengthwise of the manifold 10 and the opposite ends of which are connected to the branch passages 23 and 24 respectively and substantially midway between the ends of the branch passages 23 and 24. The main distribution passages 26 and 27 are disposed in side by side relation with the passage 26 being disposed above the passage 27 far enough so that the ends thereof may communicate with the passages 23 and 24 without curving the main distribution passages 26 and 27 upwardly or downwardly. However, it may be desirable to curve the opposite ends of the passages 26 and 27 laterally of the manifold 10 to provide curved passage ends 28. The passage ends 28 extend normally with respect to the branch passages 23 and 24. The body 11 also may be formed to provide inlet passage means 29 and 31 and by which the intermediate parts of the main distribution passages 26 and 27 may communicate with outlet passages formed in a carburetor such as that indicated at 32.

The body 11 also may be formed to provide transversely disposed heating fluid passages indicated at 33 and 34. The opposite ends of each of the passages 33 and 34 *have* [are adapted to communicate with] heating fluid inlets and outlets indicated at 36 and disposed in the same plane and in the plane of the outlets 12 of the manifold outlet passages 23 and 24. One of the heating fluid inlets and outlets 36 is disposed at each end and on opposite sides of the manifold 10 and in the spaces between one of each of the remote pairs and one of the adjacent pairs of the manifold outlets 12. *Each of the* [The] heating fluid inlets and outlets 36 *is* [are adapted to be] connected to *one of the* transversely disposed exhaust passages indicated at 37 and formed in each of the heads 17 across the exhaust valves *50 controlling the exhaust ports 51* of the two intermediate cylinders *52* in each bank of cylinders of the engine 19. *Other transversely disposed exhaust passages indicated at 53 are formed in each of the heads 17 from the exhaust valves 50 controlling the exhaust ports 51 of the two end cylinders 54 in each bank of cylinders of the engine 19.* The *outer* [opposite] ends of the exhaust passages 37 *and 53* communicate with exhaust manifolds 38 and 39 secured to the heads 17. Exhaust gas from the manifolds 38 and 39 is adapted to be conducted away from the engine 19 through exhaust conduits indicated at *41* [42] and *42* [43] respectively. The exhaust conduit *41* [38] preferably is provided with an exhaust heat control valve indicated at 43 and adapted to restrict the flow of exhaust gas through the exhaust conduit 41 when the engine is cold and the fluid pressure in the exhaust conduit is low. It will be apparent that if the heat control valve 43 closes the exhaust conduit 41 then exhaust gas will flow from the end cylinders *54 in the head 17* on this side of the engine into the exhaust manifold 38 and will be conducted with the exhaust gas from the two intermediate cylinders *52* on the same side of the engine through the exhaust passages 37 which extend across the head *of the engine* [17] adjacent the intermediate cylinders [of the engine] and into the heating fluid passages indicated at 33 and 34. From the passages 33 and 34 the exhaust gas will be conducted to the exhaust manifold 39 on the opposite side of the engine through the exhaust passages 37 formed in the other head *17* [of the engine] and across the other two intermediate cylinders *52* of the engine. The exhaust manifold 39 then will collect all of the exhaust gas from both banks of cylinders which will be conducted from the engine through the exhaust conduit 42.

The exhaust or heating fluid passages 33 and 34 each comprise heating fluid chambers indicated at 44 and 46. The *chamber 44 extends* [chambers 44 extend] directly along the side walls of the branch passages 23 which are in directly opposed relation to the junctions between the branch passages 23 and the ends of the main distribution *passages 26 and 27* [passage 26]. The chamber[s] 46 also extend*s* directly along the side walls of the branch passages 24 which are in directly opposed relation to the junctions between the branch passages 24 and the ends of the main distribution *passages 26 and 27* [passage 27]. The heating fluid passages 33 and 34 also are enlarged to provide heating fluid chambers 47 adjacent the outer ends of the passages and the opposite ends of the heating chambers 44 and 46. The chambers 47 lie in directly opposed relation to the curved outer walls of the curved ends 28 of the main distribution passages 26 and 27.

When exhaust gas from the engine 19 flows through the heating fluid passages 33 and 34 the chambers 44 will heat the side walls of the passages 23 in directly opposed relation to the junctions between the opposite ends of the main distribution passage 26 and the branch passages 23. The chambers 46 likewise will heat the side walls of the manifold branches 24 which are in directly opposed relation to the junctions between the passages 24 and the main distribution passage 27. The chambers 47 will heat the outer walls of the bends 28 at the opposite ends of each of the main distribution passages 26 and 27. Since all of the heating done by the heating fluid within the passages 33 and 34 is applied to walls where the flow of combustible mixture within the manifold passages is changed in direction it will be apparent that the heavy particles of fuel will be separated from the combustible mixture and will be vaporized upon the heated side walls referred to.

When the engine 19 becomes sufficiently heated or when sufficient exhaust gas pressure is applied to the control valve 43 the control valve will completely open the passage between the exhaust manifold 38 and the exhaust conduit 41 thereby causing the flow of exhaust gas to be outwardly from all cylinders and into the exhaust manifolds 38 and 39. Thereafter the flow of exhaust gas through the heating fluid passages 33 and 34 will be negligible and the combustible mixture therefore will be supplied to the engine without appreciable heating.

I claim:

1. An inlet manifold for engines comprising *a* manifold body formed to provide a pair of main distribution passages having branch passages communicating with the opposite ends thereof, said branch passages being formed to communicate with the ends of said main distribution passages intermediate the ends of said branch passages and having outlet ends adapted to communicate with inlet passages leading to engine cylinders, and heating passage means associated with said manifold for heating the combustible mixture supplied to said engine cylinders by said manifold, said heating passage means being formed to provide heating chambers beyond the walls of said branch passages directly opposite the ends of the main distribution passages and [at] opposing the junctions between said branch passages and said main distribution passages.

2. An inlet manifold for engines comprising a body formed to provide a pair of main distribution passages having inlet opening means intermediate the ends thereof, branch passages formed in said body and communicating intermediate the ends thereof with the ends of said main distribution passages, said branch passages being formed at the opposite ends thereof to provide outlet opening means each adapted to communicate with one cylinder of an internal combustion engine, and heating passage means formed in said body and including heating cavity means disposed in heat conducting relation to the junctions between said main distribution passages and said branch passages.

3. An inlet manifold for engines comprising a body formed to provide a pair of parallel main distribution passages, inlet opening means formed in said main distribution passages and intermediate the ends thereof for supplying combustible mixture to each of said main distribution passages, branch passages formed in said body and communicating with the ends of said main distribution passages intermediate the ends of said branch passages, said branch passages being formed to provide outlet opening means at the ends thereof and each leading to a cylinder of an internal combustion engine, and heating passage means formed in said body at each end of said manifold and being formed to provide heating chamber means in heat conducting relation to the junctions between each of said branch passages and the ends of said main distribution passages, said body being formed to provide a pair of inlet and outlet ports for each of said heating passage means, each of said inlet and outlet ports being adapted to communicate with an exhaust passage leading to a different cylinder of said engine.

4. An inlet manifold comprising a body having a plurality of manifold outlets formed on opposite sides thereof, there being one of said manifold outlets for each of the four cylinders *on each side* of a V-type 8-cylinder engine, branch passages formed in said body and extending across said body and communicating with a manifold outlet on each side of said manifold, each of said branch passages being adapted to communicate with an end cylinder and an intermediate cylinder of said engine, main distribution passages formed in said body in parallel relation to one another and to the sides of said manifold, said main distribution passages being formed adjacent the opposite ends thereof to provide bends in said main distribution passages, said main distribution passages being formed in said body at the outer ends of said bends to open into said branch passages intermediate the ends of said branch passages and normally with respect to said branch passages, and inlet opening means formed in said body and communicating with each of said main distribution passages intermediate the ends thereof.

5. An inlet manifold for engines comprising a manifold body having manifold outlets formed in rows on opposite sides of said body, said manifold outlets on each side of said manifold being formed to provide an *adjacent* [adjustment] pair of manifold outlets and a remote pair of manifold outlets, said adjacent pairs of manifold outlets being formed in said body with a common wall therebetween, said remote pairs of manifold outlets being disposed in spaced relation to said adjacent pairs of manifold outlets and on opposite sides of said adjacent pairs of manifold outlets, branch passages formed in said body and extending across said body between one manifold outlet of an adjacent pair on one side and one manifold outlet of a remote pair on the other side of said manifold, main distribution passages formed in said body and communicating with an intermediate part of each of said branch passages, and means for supplying combustible mixture to said main distribution passages intermediate the ends thereof.

6. An inlet manifold for engines comprising a manifold body having manifold outlets formed in rows on opposite sides of said body, said manifold outlets on each side of said manifold being formed to provide an adjacent pair of manifold outlets and a remote pair of manifold outlets, said adjacent pairs of manifold outlets being formed in said body with a common wall therebetween, said remote pairs of manifold outlets being disposed in spaced relation to said adjacent pairs of manifold outlets and on opposite sides of said adjacent pairs of manifold outlets, branch passages formed in said body and extending across said body between one manifold outlet of an adjacent pair and one manifold outlet of a remote pair of said manifold, main distribution passages formed in said body and communicating with an intermediate part of each of said branch passages, heating fluid inlets and outlets formed in said body and in said rows of manifold outlets on opposite sides of said body, there being one of said heating fluid inlets and outlets on each side of said body and between one manifold outlet of said adjacent pairs and one manifold outlet of said remote pairs of manifold outlets, heating passage means formed in said body between said heating fluid inlets and outlets on opposite sides of said body, said heating fluid passage means being formed to provide chambers adjacent said main distribution passages and said branch passages in said manifold for heating the combustible fluid in said passages, and means for supplying combustible mixture to said main distribution passages.

7. An inlet manifold for engines comprising a manifold body having manifold outlets formed in rows on opposite sides of said body, said manifold outlets on each side of said manifold being arranged in spaced pairs of manifold outlets, there being a plurality of said spaced pairs of manifold outlets on each side of said manifold, branch passages formed in said manifold body and extending across said manifold body between one manifold outlet of each pair of manifold outlets on the opposite sides of said manifold, said manifold outlets in said pairs and to which each branch passage is connected being the manifold outlets at the opposite ends of each of said oppositely disposed pairs of manifold outlets, main distribution passages formed in said body and connecting intermediate portions of said branch passages, means for supplying combustible mixture to said main distribution passages, heating fluid inlets and outlets formed in said body and between each of said pairs of manifold outlets, heating fluid passages formed in said body between said manifold inlets and outlets on opposite sides of said body, said heating fluid passages being formed to provide heating fluid chambers disposed adjacent said manifold branches for heating the combustible fluid supplied to said manifold branches, and inlet means for supplying combustible fluid to said main distribution passages.

8. An inlet manifold for engines comprising a manifold body having manifold outlets and heating fluid inlets and outlets formed in rows on opposite sides of said body, said manifold outlets and said heating fluid inlets and outlets being disposed in the same plane in said rows on opposite sides of said body, branch passages between said manifold outlets, main distribution passage means extending between and communicating with said branch passages for supplying combustible fluid to said branch passages, heating fluid passages extending across said manifold and between *said* heating fluid inlets and outlets on opposite sides of said manifold, said heating fluid passages being formed to provide heating fluid cavities at the junctions between said main distribution passages means and said manifold branch passages for heating the combustible mixture in said manifold branch passages and at said junctions, and inlet means for supplying combustible fluid to said main distribution passage means.

9. An inlet manifold for engines comprising a manifold body having a spaced pair of manifold outlets on one side thereof and an adjacent pair of manifold outlets on the other side thereof, branch passages formed in said body and extending between one of said spaced pair of manifold outlets and one of said adjacent pair of manifold outlets, said branch passages being formed to provide adjacent manifold branch passage walls which merge with one another at said adjacent pair of manifold outlets and diverge from one another across said manifold body to said spaced pair of manifold outlets, main distribution passage means extending through said adjacent walls and between intermediate portions of said branch passages, and means for supplying combustible fluid to said main distribution passage means.

10. An inlet manifold for engines comprising a manifold body having a spaced pair of manifold outlets on one side thereof and an adjacent pair of manifold outlets on the other side thereof, branch passages formed in said body and extending across said body and between one of said spaced pair of manifold outlets and one of said adjacent pair of manifold outlets, said branch passages being formed to provide adjacent manifold branch passage walls which merge with one another at said adjacent pair of manifold outlets and diverge from one another across said manifold body to said spaced pair of manifold outlets, main distribution passage means formed in said body and having ends forming junctions at said walls between intermediate portions of said branch passages and said main distribution passage means, heating fluid passage means formed in said body and having cavity means formed therein adjacent said junctions between said branch passages and said main distribution passage means, means for supplying combustible fluid to said main distribution passage means, and means for supplying heating fluid to said heating fluid passages.

*11. In an internal combustion engine having oppositely arranged cylinder banks each including a cylinder head and an exhaust valve port for each cylinder thereof, and an intake manifold positioned intermediate said banks on said heads and having a hot spot; means for conducting hot exhaust gases to said hot spot comprising passage means extending crosswise of said heads and intake manifold connecting said hot spot with a single exhaust port of each bank of cylinders.*

References Cited in the file of this patent or the original patent

| | | |
|---|---|---|
| 2,012,902 | Barkeij | Aug. 27, 1935 |
| 2,119,707 | Funderburk | June 7, 1938 |
| 2,135,628 | Smith | Nov. 8, 1938 |
| 2,160,922 | Sullivan | June 6, 1939 |
| 2,603,199 | Moseley | July 15, 1952 |
| 2,640,471 | Haltenberger | June 2, 1953 |
| 2,686,506 | Carpentier et al. | Aug. 17, 1954 |